C. D. FLYNT.

Assignor to G. HUNZINGER.

Spring-Seat

No. 8,405. Reissued Sept. 10, 1878.

Witnesses.

~~Otto Hufeland~~

W. C. Hauff.

Inventor.

Chester D. Flynt by

Van Santvoord & Hauff his attorneys

UNITED STATES PATENT OFFICE.

CHESTER D. FLYNT, OF BROOKLYN, NEW YORK, ASSIGNOR, BY MESNE ASSIGNMENTS, TO GEORGE HUNZINGER.

IMPROVEMENT IN SPRING-SEATS.

Specification forming part of Letters Patent No. 65,201, dated May 28, 1867; Reissue No. 8,105, dated September 10, 1878; application filed June 20, 1878.

*To all whom it may concern:*

Be it known that I, CHESTER D. FLYNT, formerly of Collinsville, Illinois, now of Brooklyn, in the county of Kings and State of New York, have invented a new and useful Improvement in Spring-Seats, which invention is fully set forth in the following specification, reference being had to the accompanying drawing, in which—

Figure 1:
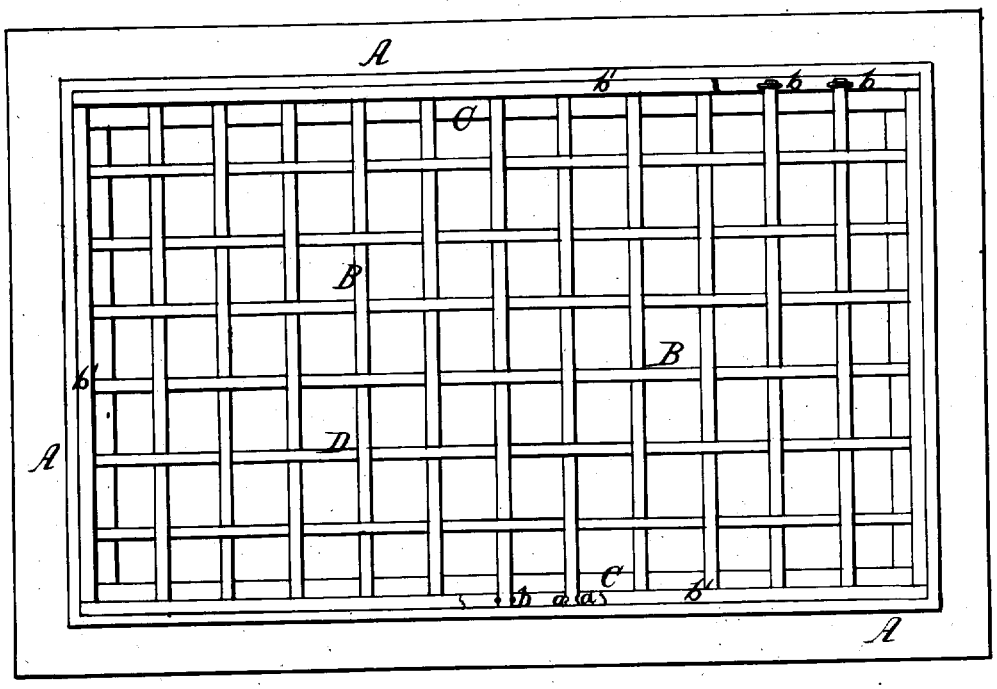
Figure 2:
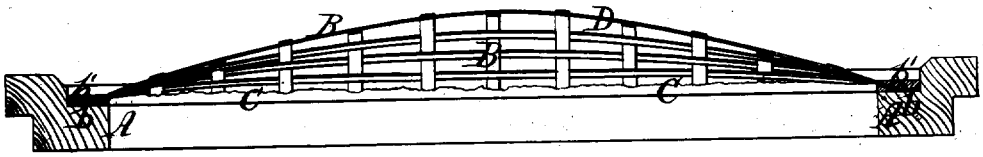

Figure 1 represents a plan or top view, some parts being cut away to expose the parts below. Fig. 2 is a longitutinal vertical section.

Similar letters indicate corresponding parts.

This invention relates to a seat formed of interwoven or interlaced metal bands or wires, the ends of which are notched and fastened to the supporting-frame by staples or other suitable means. With the seat formed as above stated, and with its supporting-frame, is combined a yielding cushion, for the purpose of raising the seat to a concave form and ot increasing the durability of the article.

In the drawing, the letter A designates the supporting-frame of my seat, which may be made of wood, in any desirable form or shape. The seat D is composed of a series of metallic bands or wires, B, by preference steel wires, such, for instance, as are used in the manufacture of hoop-skirts, and they are interwoven or interlaced with each other, as shown in Fig. 1 of the drawing. The ends of the bands B are provided with notches *a*, as shown in Fig. 1, where a portion of the covering-strap *b* is broken out, so as to expose the mode of attachment, and said bands are fastened to the frame A by staples or tacks *b*, which engage with the notches *a*, and are driven down into the frame. After the seat has been secured to the seat-frame the covering-strap *b'* is fastened down by tacks or otherwise, so as to conceal the ends of the metal bands B. The bands B are curved upward or arched, and the arch of the central bands has the greatest pitch or elevation of any in the series, the bands on each side of the central bands having successively less pitch or elevation as they approach the ends or sides of the frame. This gives the surface of the seat a dished, convex, or cushion-like contour, sloping in all directions from the center.

In order to support the seat D in a convex form, as shown in Fig. 2, I interpose between the frame A and the bands B a cushion, C, of india-rubber or other similar elastic material.

I am aware that seats have been made of strips of cane or of wood interwoven or interlaced in various ways. I do not therefore claim the woven nature of my seat as new.

My seats can also be readily repaired, since each of the bands B, when broken, can be readily removed and replaced by another without disturbing the remaining bands.

What I claim as new, and desire to secure by Letters Patent, is—

1. A seat composed of metallic bands or wires, the ends of which are fixed to a frame, and a yielding cushion interposed between the said steel wires or bands and frame, substantially as and for the purpose set forth.

2. A seat or support composed of interlaced metallic bands or wires firmly fixed to a permanent frame, and having a yielding cushion interposed between the said metallic bands or wires and the said permanent frame, substantially as described.

3. The spring-cushion C, in combination with the frame A and the bands B, substantially as described.

4. A seat or support consisting of a wooden frame and metallic wires or bands, having their ends notched and secured to the said frame by staples resting in said notches, substantially as set forth.

In testimony that I claim the foregoing I have hereunto set my hand and seal this 17th day of May, 1878.

CHESTER D. FLYNT. [L. S.]

Witnesses:

W. HAUFF,

E. F. KASTENHUBER.